United States Patent [19]

Sundaresan

[11] Patent Number: 5,987,255

[45] Date of Patent: Nov. 16, 1999

[54] METHOD OF, SYSTEM FOR, AND ARTICLE OF MANUFACTURE FOR PROVIDING A GENERIC ADAPTOR FOR CONVERTING FROM A SEQUENTIAL ITERATOR TO A PRE-THREAD PARALLEL ITERATOR

[75] Inventor: Neelakantan Sundaresan, San Jose, Calif.

[73] Assignee: International Business Machines Corporation, Armonk, N.Y.

[21] Appl. No.: 08/820,394

[22] Filed: Mar. 12, 1997

[51] Int. Cl.⁶ ...................................................... G06F 9/44
[52] U.S. Cl. ...................... 395/706; 395/705; 395/800.16
[58] Field of Search .............................. 395/706, 800.16, 395/705

[56] References Cited

U.S. PATENT DOCUMENTS

| | | | |
|---|---|---|---|
| 4,344,134 | 8/1982 | Barnes | 364/200 |
| 4,347,498 | 8/1982 | Lee et al. | 340/825.02 |
| 4,843,540 | 6/1989 | Stolfo | 364/200 |
| 4,845,744 | 7/1989 | DeBenedictis | 379/221 |
| 4,860,201 | 8/1989 | Stolfo et al. | 364/200 |
| 5,404,521 | 4/1995 | Murray | 395/650 |
| 5,535,393 | 7/1996 | Reeve et al. | 395/706 |
| 5,764,993 | 6/1998 | Shirdo | 395/709 |

OTHER PUBLICATIONS

Halstead, Robert H., Jr. *Multilisp: A Language for Concurrent Symbolic Computation*. ACM Transactions on Programming Languages and Systems, vol. 7, No. 4, pp. 501–508, Oct. 1985.

Yokote, Yasuhiko. *The Design and Implementation of Concurrent Smalltalk*, World Scientific Series in Computer Science, vol. 21 1990.

Leddy, William J., and Smith, K. Stuart, *The Design of the Experimental Systems Kernel*. Proceedings of the Fourth Conference on Hypercubes, Concurrent Computers and Applications, Monterey, CA, 1989, pp. 737–743.

Liskov, Barbara and Shrira, Liuba. *Promises: Linguistic Support for Efficient Asynchronous Procedure Calls in Distributed Systems*. Proceedings of the SIGPLAN'88 Conference on Programming Language Design and Implementation, Atlanta, Georgia pp. 260–267, Jun. 1988.

(List continued on next page.)

*Primary Examiner*—Larry D. Donaghue
*Assistant Examiner*—John Follansbee
*Attorney, Agent, or Firm*—Prentiss W. Johnson

[57] ABSTRACT

A generic adaptor for converting from a sequential iterator to a parallel iterator is provided for the parallelization of sequential algorithms. The parallel algorithm implementation of a sequential algorithm is provided by the use of a template function with one template parameter in addition to those parameters of the corresponding sequential algorithm. This additional parameter is a strategy object which is an instance of a strategy class. In the body of the parallel algorithm, the strategy object is used to convert each sequential iterator to a plurality of per-thread parallel iterators. Each per-thread parallel iterator traverses those portions of a container for which the thread corresponding to this per-thread parallel iterator is responsible. When each thread has computed a partial result, the results are composed through a reduction operation if the partial results are an associative or commutative operation for a particular work distribution. A strategy class is conceptually an iterator adaptor which provides an operator that converts a sequential iterator to a plurality of per-thread parallel iterators. For instance, given two sequential iterators 'first' and 'last' corresponding to the beginning and end of a container sequence, a block strategy class may provide N pairs of per-thread parallel iterators, begin$_i$ and end$_i$, such that each of the N threads may process one of N blocks of data between 'first' and 'last'. Similarly, a cyclic strategy class may provide N per-thread parallel iterators that hop over an iteration space of a container by lengths of N where N is the number of threads participating.

6 Claims, 8 Drawing Sheets

OTHER PUBLICATIONS

Reppy, John H., *Concurrent ML: Design, Application and Semantics, Concurrent ML Manual*. AT&T Bell Laboratories, Feb. 1993, Version 0.9.8.

Grimshaw, Andrew S. *Easy–to–use Object–Oriented Parallel Processing with Mentat*. IEEE Computer, pp. 39–51, May 1993.

Lavender, R. Greg and Kafura, Dennis G., *A Polymorphic Future and First–class Function Type for Concurrent Object–Oriented Programming*, Sponsored in part by National Science Foundation grant CCR–9104013.

Callahan, David and Smith, Burton. *A Future–based Parallel Language For a General–purpose Highly–parallel Computer*. Tera Computer Company, 400 N. 34th Street, Suite 300, Seattle, WA 98103, ARPA Order No. 6512, Program Code No. E20 issued by DARPA/CMO under Contract # MDA972–89–C–0002 and Sponsored by the Defense Advanced Research Projects Agency Information Science and Technology Office.

Sheffler, Thomas J., *The Amelia Vector Template Library*, Parallel Programming Using C++,Scientific & Engineering Computation Series, 1996, pp. 43–89.

Zhang, Shipei; Sokolsky, Oleg; Smolka, Scott A., *On the Parallel Complexity of Model Checking in the Modal Mu–Calculus*, Proceedings of the 1994 IEEE $9^{th}$ Annual Symposium on Logic in Computer Science, pp. 154–164.

Clark F. Olson, *Connectionist Networks for Feature Indexing and Object Recognition*, Proceedings of the 1996 IEEE Computer Society Conference on Computer Vision and Pattern Recognition, pp. 907–912.

Transpose algorithm with different implementations for the Block and Cyclic strategies

```
template <class Strategy, class InputIterator, class OutputIterator>      830
OutputIterator transpose(Strategy& strategy, InputIterator first, InputIterator last) {
    return transpose(strategy, first, last, strategy_category(strategy));
}
                                                                          810
template <class Strategy, class InputIterator, class OutputIterator>
OutputIterator transpose(Strategy& strategy, InputIterator first, InputIterator last, block_strategy_tag btag) {
    ... code specific to Block strategy ...                               840
}
                                                                          820
template <class Strategy, class InputIterator, class OutputIterator>
OutputIterator transpose(Strategy& strategy, InputIterator first, InputIterator last, cyclic_strategy_tag ctag) {
    ...code specific to Cyclic strategy ...                               850
}
```

```
                    Parallel Implementation of Count Algorithm
1020 — template <class Strategy, class InputIterator, class T, class Size>
1026 — void count(Strategy& strategy, InputIterator first, InputIterator last, const T& value, Size& n){
1028 — Rope& self_rope = Rope::SelfRope()(); // the current data-parallel object
1032 — int rope_size = self_rope.Size();
1034 — ReductionT<Size, plus<Size> > red (self_rope. ReductionObj()) ; //type-specific reduction
1042 — Strategy::thread_iterator my_first(first), my_last(last);
1052 — strategy(rope_size, first, last, my_first, my_last); // obtain thread-specific iterator
1058 — Size my_n = 0;
1062 — ::count(my_first, my_last, value_pred, my_n); // sequential count
1066 — Size total = red(plus<Size>(), my_n); // reduction
1070 — n + = total;
      }
```

Example of User Code

```
1110 — typedef vector<int> list_type;  // vector of integers
       typedef list_type::iterator list_iter_type;  // iterator
       typedef list_iter_type ra_iter_type;  // iterator
       list_type xlist;  // variable xlist 1120 — typedef block_strategy<list_iter_type, ra_iter_type, list_type::value_type,
           list_type::reference, list_type::difference_type> block_strategy_type;  // block strategy type
       block_strategy_type block_st;  // block strategy object 1130 — typedef cyclic_strategy<list_iter_type, ra_iter_type, list_type::value_type,
           list_type::reference, list_type::difference_type> cyclic_strategy_type;  // cyclic strategy type
       cyclic_strategy_type cyclic_st;  // cyclic strategy object 1140 — typedef grab_strategy<list_iter_type, ra_iter_type, list_type::value_type,
           list_type::reference, list_type::difference_type> grab_strategy_type;  // grab strategy type
       grab_strategy_type grab_st;  // grab strategy object
       // assume that xlist has already been populated
       int value = 5;
       int init_val1 = 0, init_val2 = 0, init_val3 = 0;
       // count using block strategy
1150 — count(block_st, xlist.begin(), xlist.end(), value, init_val1);
       // count using cyclic strategy                        └─1180
1160 — count(cyclic_st, xlist.begin (), xlist.end (), value, init_val2);
       // count using grab strategy                        └─1185
1170 — count(grab_st, xlist.begin(), xlist.end(), value, init_val3);
                                                           └─1190
```

FIG. 11

METHOD OF, SYSTEM FOR, AND ARTICLE OF MANUFACTURE FOR PROVIDING A GENERIC ADAPTOR FOR CONVERTING FROM A SEQUENTIAL ITERATOR TO A PRE-THREAD PARALLEL ITERATOR

CROSS-REFERENCE TO RELATED APPLICATIONS

Application Ser. No. 08/815,231, filed concurrently herewith on Mar. 12, 1997 for A METHOD OF, SYSTEM FOR, AND ARTICLE OF MANUFACTURE FOR PROVIDING A GENERIC ADAPTOR FOR CONVERTING FROM A NON-FUTURE FUNCTION POINTER TO A FUTURE FUNCTION OBJECT (IBM Docket ST9-96-070), currently co-pending, and assigned to the same assignee as the present invention;

Application Ser. No. 08/820,393, filed concurrently herewith on Mar. 12, 1997 for A METHOD OF, SYSTEM FOR, AND ARTICLE OF MANUFACTURE FOR PROVIDING A GENERIC REDUCTION OBJECT FOR DATA PARALLELISM (IBM Docket St9-96-071), currently co-pending, and assigned to the same assignee as the present invention; and Application Ser. No. 08/815,234, filed concurrently herewith on Mar. 12, 1997 for A METHOD OF, SYSTEM FOR, AND ARTICLE OF MANUFACTURE FOR PROVIDING A DATA STRUCTURE SUPPORTING A GENERIC REDUCTION OBJECT FOR DATA PARALLELISM (IBM Docket ST9-96-073), currently co-pending, and assigned to the same assignee as the present invention.

The foregoing copending applications are incorporated herein by reference.

A portion of the Disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to the fields of generic programming and parallel programming, and more particularly to a generic adaptor for converting from a sequential iterator to a parallel iterator.

2. Description of the Related Art

Parallel programming or parallel processing is a method of processing that executes on a computer containing two or more processors running simultaneously. A primary objective of parallel processing is dividing a task so that it may be distributed among the available processors.

Object oriented programming languages such as C and C++ support arrays which are contiguous address spaces, and pointers that may be used to traverse these arrays. An iterator is a generalization of a pointer that allows a programmer to work with different data structures or containers in a uniform manner. Generic programming, such as the Standard Template Library or STIL, may provide iterators that are objects with operators that allow traversal of the data structures they point to and also operators that allow accessing the content at the current position pointed to by the iterator. STL defines different iterator categories such as input, output, forward, backward, and random access. This categorization is based on iterator properties such as direction of traversal, quantum of traversal, readability, or writability into the data structures to which an iterator points. An STL iterator is inherently sequential in nature because each iterator defines a single cursor of traversal and update. This sequential single cursor iterator is inadequate for the non-sequential multi-task needs of parallel programming.

HPC++ is a C++ library and language extension framework for parallel programming. HPC++ extends iterators for use in parallel programming in distributed address spaces. HPC++ provides distributed containers which are template data structures distributed over multiple computer address spaces. These distributed containers provide iterators that allow the traversal of the entire range of a distributed container across different address spaces. For each address space, HPC++ adaptor functions may return local iterators which mark the range of a portion of the distributed container within the local address space. Thus HPC++ parallel iterators are based on distributed address spaces for different data distributions of distributed containers. However, HPC++ parallel iterators fail to provide support based on task distribution. HPC++parallel iterators also fail to provide different parallel algorithm implementations for different task or data distributions for supporting needs of correctness or efficiency.

Although HPC++ fails to provide task distribution strategies, there are other parallel programming libraries which provide task distribution strategies. However, these parallel programming libraries fail to provide generic parallel task distribution strategies.

In providing parallel implementations of algorithms, conventional systems have failed to recognize the benefits of designing an implementations in such a way that different strategies of work distribution may be made a part of the algorithm implementation. In sequential programming, the conventional STL system reduces N*M*K possible implementations for N data types, M containers, and K algorithms to possibly N+M+K implementations. However, conventional parallel programming has failed to recognize that if there are P strategies of work distribution for N data types, M containers, and K algorithms, that the N*M*K*P possible parallel implementations may be reduced to N+M+K+P implementations.

Despite the above developments and benefits of both parallel programming and generic programming, both have failed to recognize the need for or provide a solution of a generic abstraction which may convert a sequential iterator to a parallel iterator with a parallel work distribution strategy to further the reuse of sequential algorithms in corresponding parallel implementations. As such, there is a need for a method of, apparatus for, and article of manufacture for providing a generic adaptor for converting from a sequential iterator to a parallel iterator with a parallel work distribution strategy.

SUMMARY OF THE INVENTION

The invention disclosed herein comprises a method of, a system for, and an article of manufacture for providing a generic adaptor for converting from a sequential iterator to a parallel iterator with a parallel work distribution strategy.

The present invention provides a parallel algorithm implementation of a sequential algorithm which is a template function with one template parameter in addition to those parameters of the corresponding sequential algorithm. This additional parameter is a strategy object which is an instance of a strategy class. In the body of the parallel algorithm, the strategy object is used to convert each sequential iterator to a plurality of per-thread parallel iterators. Each per-thread parallel iterator traverses those portions of a container for which the thread corresponding to this per-thread parallel iterator is responsible. When each thread has computed a partial result, the results are composed through a reduction operation if the partial results may be composed this way for a particular work distribution.

A strategy class is conceptually an iterator adaptor which provides an operator that converts a sequential iterator to a plurality of per-thread parallel iterators. For instance, given two sequential iterators 'first' and 'last' corresponding to the beginning and end of a container sequence, a block strategy class may provide N pairs of per-thread parallel iterators, $begin_i$ and $end_i$, such that each of the N threads may process one of N blocks of data between 'first' and 'last'. Similarly, a cyclic strategy class may provide N per-thread parallel iterators that hop over an iteration space of a container by lengths of N where N is the number of threads participating.

In accordance with one aspect of this invention, the generic adaptor converts a sequential iterator into a per-thread parallel iterator.

In accordance with another aspect of this invention, the generic adaptor converts the sequential iterator into the per-thread parallel iterator based on a strategy for work distribution which specifies an access and traversal of an iterator space by one or more per-thread parallel iterators participating in a data-parallel operation.

In accordance with another aspect of this invention, the strategy for work distribution among a plurality of threads is static.

In accordance with another aspect of this invention, the strategy for work distribution among a plurality of threads is dynamic.

In accordance with another aspect of this invention, the strategy for work distribution among a plurality of threads may be either static or dynamic.

In accordance with another aspect of this invention, the conversion of the sequential iterator into the per-thread parallel iterator is performed by use of a strategy template class.

In accordance with another aspect of this invention, a strategy object is an instance of the strategy class.

In accordance with another aspect of this invention, the strategy template class is defined for a strategy such that:
  this class exports a type definition for a corresponding per-thread parallel iterator for one or more sequential iterators; and
  a member operator, the O operator, returns one or more per-thread parallel iterators when given one or more sequential iterators.

The present invention has the advantage of providing improved parallelization of sequential code.

The present invention has the further advantage of improving expressibility of parallel code.

The present invention has the further advantage of improving maintenance of parallel code.

The present invention has the further advantage of improving reuse of sequential code and parallel code.

BRIEF DESCRIPTION OF THE DRAWINGS

For a more complete understanding of the present invention and the advantages thereof, reference is now made to the Detailed Description in conjunction with the attached Drawings, in which.

DESCRIPTION OF THE PREFERRED EMBODIMENT

Figure 1:
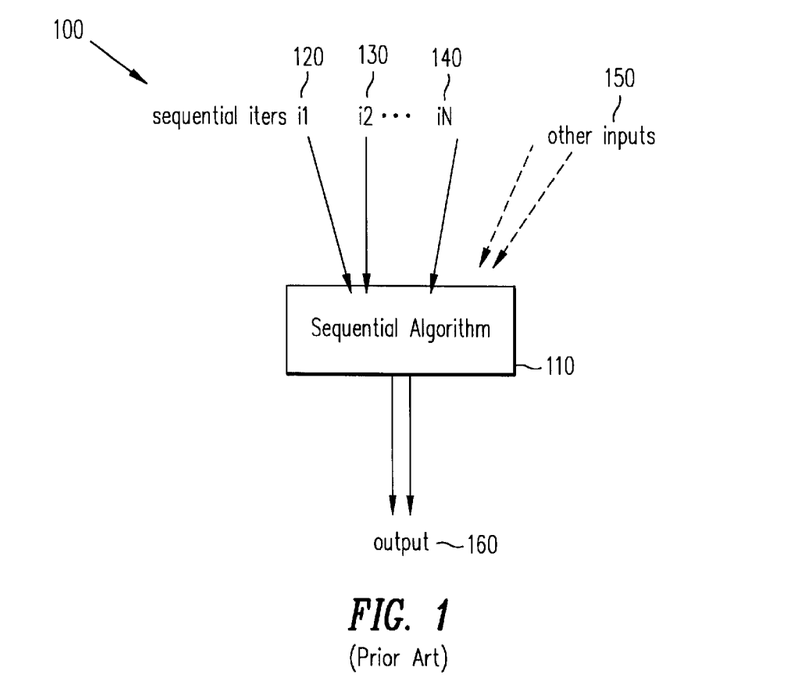
FIG. 1 illustrates a sequential algorithm implementation using sequential iterators in accordance with the prior art.
Figure 2:
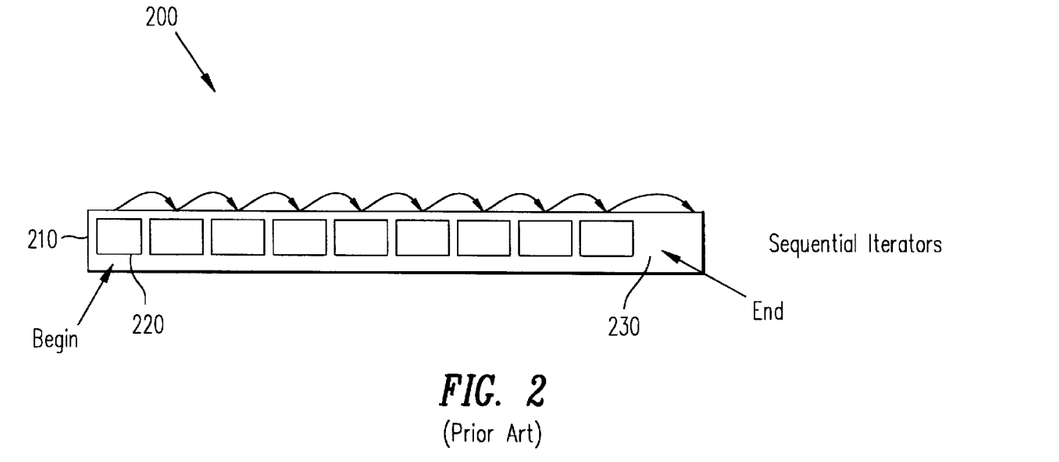
FIG. 2 illustrates a traversal of a sequential iterator across an iteration space of a container in accordance with the prior art.

Referring now to FIG. 1, a sequential algorithm using a sequential iterator in accordance with the prior art is illustrated. A sequential algorithm 110 takes sequential iterators 120, 130, 140 which may be a first iterator 120 to indicate the beginning of a sequence and a second iterator 130 to indicate the end of the sequence, and other inputs 150. Sequential algorithm 110 then performs a specified algorithm or operation on each element of the sequence progressing sequentially from an element specified by the first iterator 120 to the end of the sequence specified by the second iterator 130 to produce an output 160. The sequential algorithm 110 may also take additional sequential iterators 130 which, for example, follow a traversal between the first two iterators. FIG. 2 illustrates such a sequential traversal 200 across elements of a container 210 from a first element begin 220 to the end of the sequence 230.

Referring next to FIG. 3 through FIG. 8 and FIG. 10 through FIG. 11, behavior diagrams, class templates, class diagrams, and code listings illustrating operations preferred in carrying out the present invention are shown. The conventions used in these Figures are well understood by those skilled in the art, and the Figures are sufficient to enable one of ordinary skill to write code in any suitable computer programming language.

Figure 3:
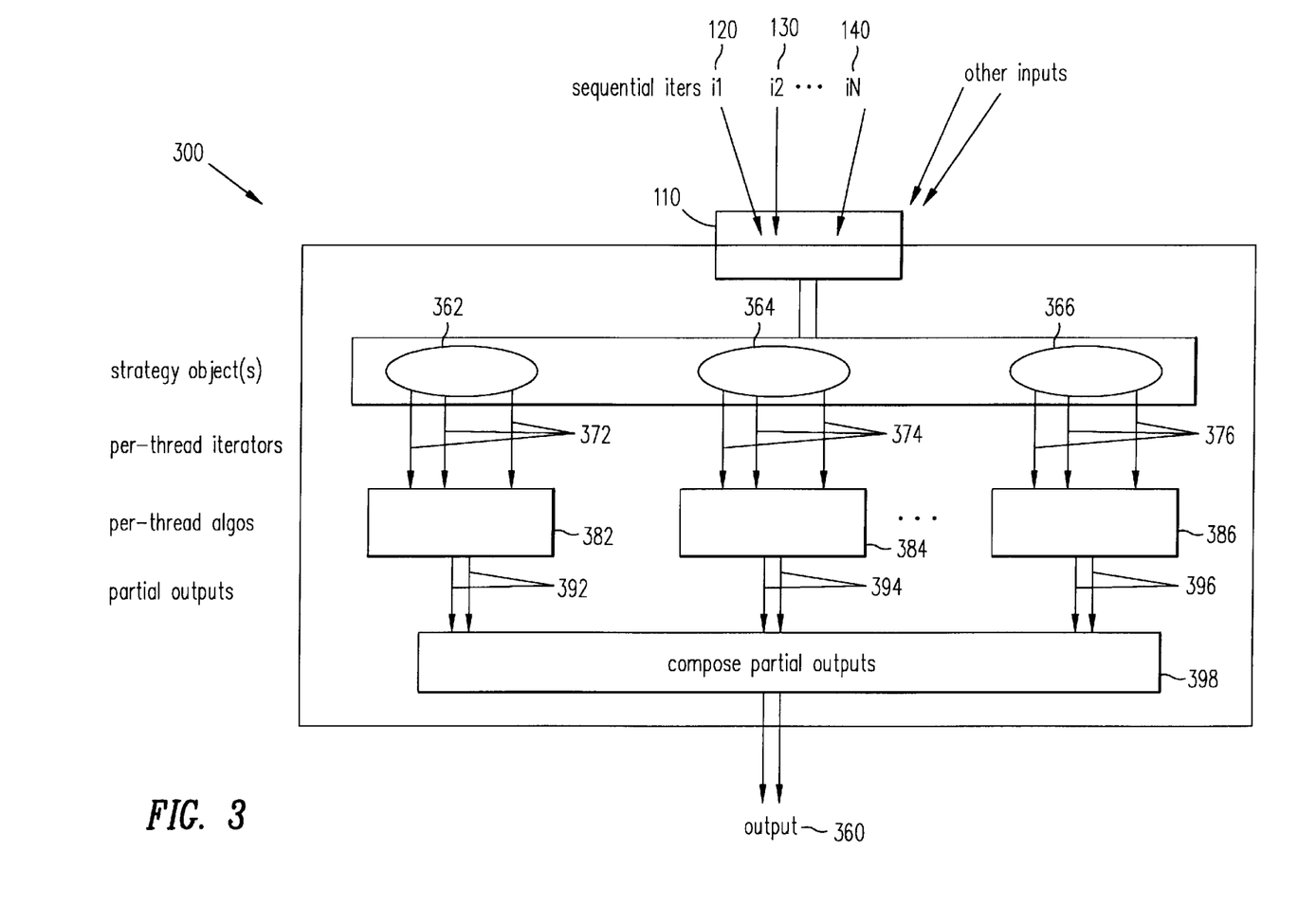
FIG. 3 illustrates a parallel algorithm implementation using per-thread parallel iterators in accordance with the present invention.
Figure 4:
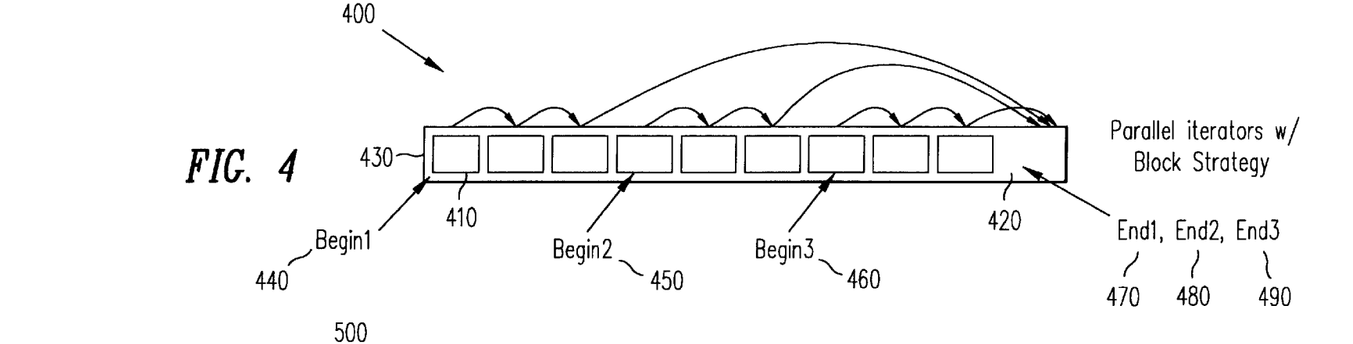
FIG. 4 illustrates block strategy traversals of parallel per-thread iterators across an iteration space of a container in accordance with the present invention.
Figures 5, 6:
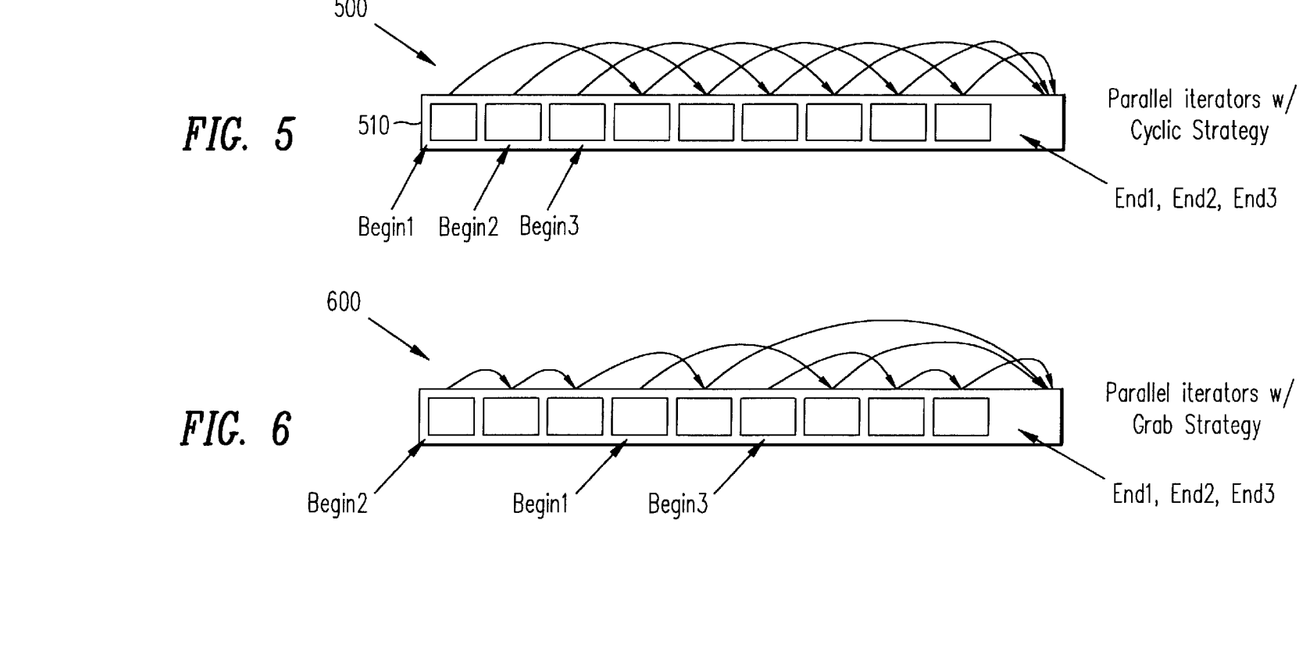
FIG. 5 illustrates cyclic strategy traversals of parallel per-thread iterators across an iteration space of a container in accordance with the present invention.
FIG. 6 illustrates grab strategy traversals of parallel per-thread iterators across an iteration space of a container in accordance with the present invention.

The present invention provides a parallel algorithm implementation, 300 of FIG. 3, of the sequential algorithm 110. This parallel algorithm implementation is a template function with one template parameter in addition to those parameters of the corresponding sequential algorithm 110. This additional parameter is a strategy object 362, 364, 366 which is an instance of a strategy class. In the body of the parallel algorithm, the strategy object 362, 364, 366 is used to convert each sequential iterator 120, 130, 140 to a plurality of per-thread parallel iterators 372, 374, and 376. Each per-thread parallel iterator 372, 374, and 376 traverses those portions of a container for which the per-thread algorithm 382, 384, and 386 corresponding to this per-thread parallel iterator is responsible. A per-thread algorithm is a particular thread's share of the total parallel algorithm based on the parallel work distribution strategy. When each thread has computed a partial result 392, 394, 396, an output 360 is composed from the partial results 392, 394, 396 through a reduction operation 398 if the partial results may be composed this way for a particular work distribution.

Strategy Class

A strategy class is conceptually an iterator adaptor which provides an operator that converts a sequential iterator to a plurality of per-thread parallel iterators. For instance, given two sequential iterators 'first' and 'last' corresponding to the beginning 410 and end 420 of a container sequence 430, a block strategy class may provide a block strategy traversal 400 of N (N=3 in FIG. 4) pairs of per-thread parallel iterators, $begin_i$ (440, 450, and 460) and $end_i$ (470, 480, and 490) such that each of the N threads may process one of N blocks of data between 'first' and 'last'. Alternatively, a cyclic strategy class may provide a cyclic strategy traversal 500 in which N per-thread parallel iterators hop over an iteration space of a container 510 by lengths of N where N is the number of threads participating (N=3 in FIG. 5). In yet another alternative, a grab strategy class may provide a grab strategy traversal 600 in which N per-thread parallel iterators are monitored due to an iterator operation affecting subsequent iterator operations performed by other threads (N=3 in FIG. 6). Block, cyclic, and grab strategies are merely exemplary alternative embodiments as the strategy class may support other strategies and traversals. Thus it may be appreciated that the present invention not only converts from a sequential iterator to per-thread parallel iterators, but also provides flexibility in the work strategy or work distribution performed by these per-thread parallel iterators to address performance, efficiency, and portability concerns.

Figure 7:
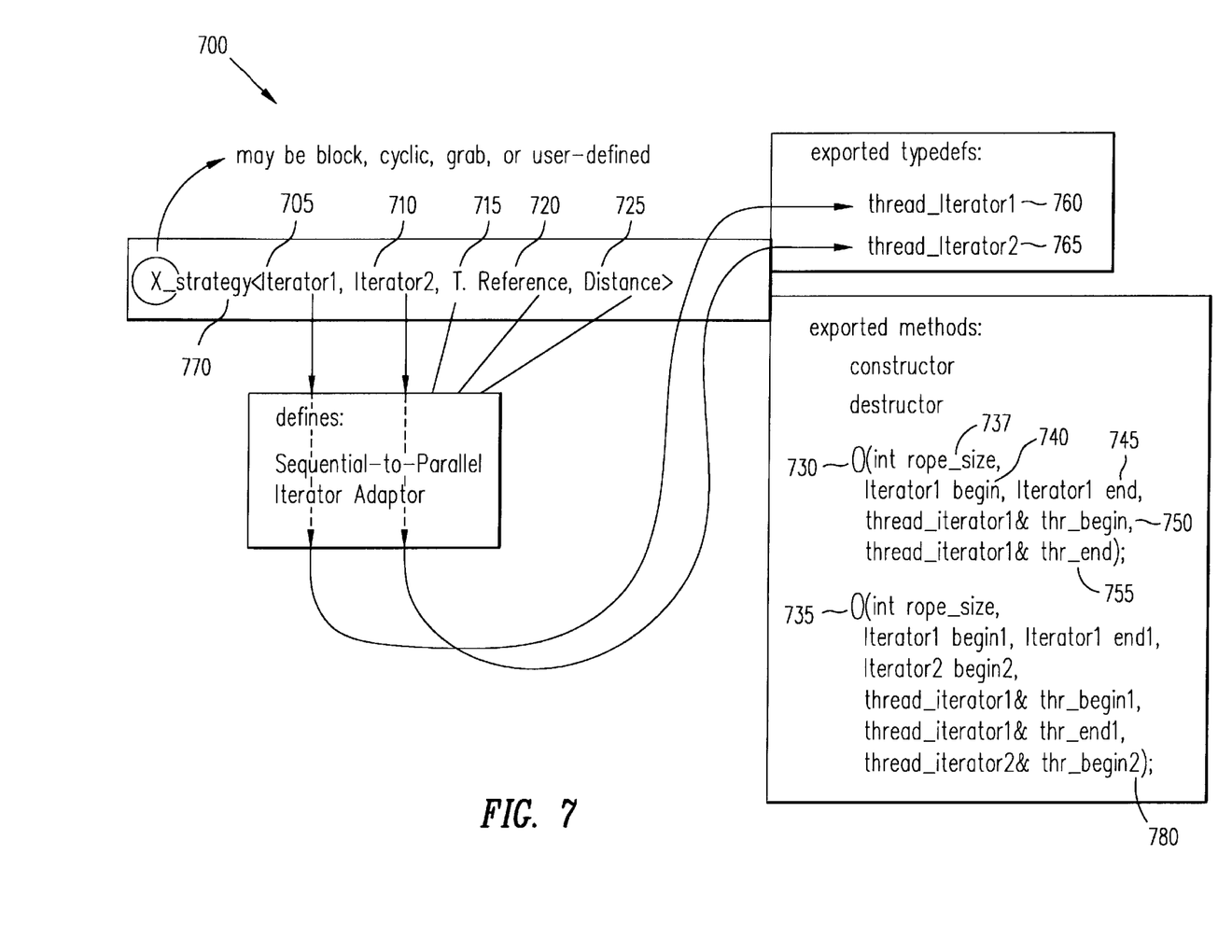
FIG. 7 illustrates a strategy adaptor function template diagram in accordance with the present invention.

Referring now to FIG. 7, a strategy class 700 is illustrated. The strategy class 700 may be implemented as a template class X_strategy 770, where X_strategy may be either block strategy, cyclic strategy, grab strategy, or a user defined strategy. The strategy class 700 is templatized on sequential iterator types 705 and 710, value types 715, reference types 720 which are the type of the reference to the object of type T 715, and distance types 725 which are a type that may be used to represent a difference between two pointers to T in a memory model. It supports operators 730 and 735 that, given sequential iterators 740 and 745, return per-thread parallel iterators 750 and 755. The strategy class 700 exports a type definition for one 760 or more per-thread parallel iterators 765 corresponding to one 705 or more sequential iterators 710. Providing a per-thread parallel iterator for each of the sequential iterators makes a strategy class more usable in that the strategy class may be used to parallelize additional sequential algorithms.

Typically, algorithms process with the use of iterator pairs, a first iterator 740 to indicate the beginning of a sequence and a second iterator 745 to indicate the end of the sequence. To aid in the parallelization of such two-iterator algorithms, a strategy class may provide an 'O' operator 730 that returns the per-thread parallel iterators 750 and 755 when given the pair of sequential iterators 740 and 745. This operator 730 may be defined for one or more of the sequential iterator types as follows, where a rope_size parameter 737 indicates a number of participating threads:

operatorO(int rope_size, iterator_type begin, iterator_type end, thread_iterator_type&thr_begin, thread_iterator_type& thr_end)

Other algorithms may also have a third iterator that follows a traversal between the first two iterators. For such three-iterator algorithms, a strategy class may also provide a second 'O' operator 735 which, in addition to returning per-thread parallel iterators thr_begin, and thr_end, corresponding to $begin_1$ and $end_1$, also returns the per-thread parallel iterator thr_$begin_2$ 780 corresponding to iterator $begin_2$ that depends on $begin_1$ and $end_1$:

operatorO(int rope_size, iterator_type1 $begin_1$, iterator_type1 $end_1$, iterator_type2 $begin_2$, thread_iterator_type1& thr_$begin_1$, thread_iterator_type1&thr_$end_1$, thread_iterator_type2& $begin_2$);

Strategy Categories and Tags

There may be algorithms for which even different strategies may need different implementations as it may not be possible for a particular strategy class to provide both implementation "O" operators all sequential iterators and algorithms. Alternatively, and even if it does provide all of the above, it may not be possible for a parallelized algorithm to use it effectively, i.e., it may not be possible to provide the same algorithm implementation for two different strategy classes for efficiency or correctness reasons. To address this problem, strategy tags and strategy categories are introduced. The need for different implementations of a strategy may depend on how the per-thread partial results are composed to produce the final results. For instance, the remove algorithm which removes elements of a particular value from a list for a cyclic work strategy cannot compose the updated list by merely appending the partial results in a reduction operation as this may place the elements out of order. However, such an appending of the partial results in a reduction operation can be done for the block strategy. Although generic parallel algorithms may be written for sequential algorithms, the same implementation of a parallel algorithm may not perform correctly or efficiently for all strategy types. Thus, strategy-specific implementations may be required. To address these problems, the present invention derives strategy classes from two base empty classes: static_strategy and dynamic_strategy. A strategy tag corresponding to each strategy class is also defined which may be used to provide implementations specific to different strategies. The strategy tag for any strategy class S may be obtained from a strategy_category function:

```
S_category_tag strategy_category(const S& strategy) {
    return S_strategy_tag( );
}
```

Figure 8:
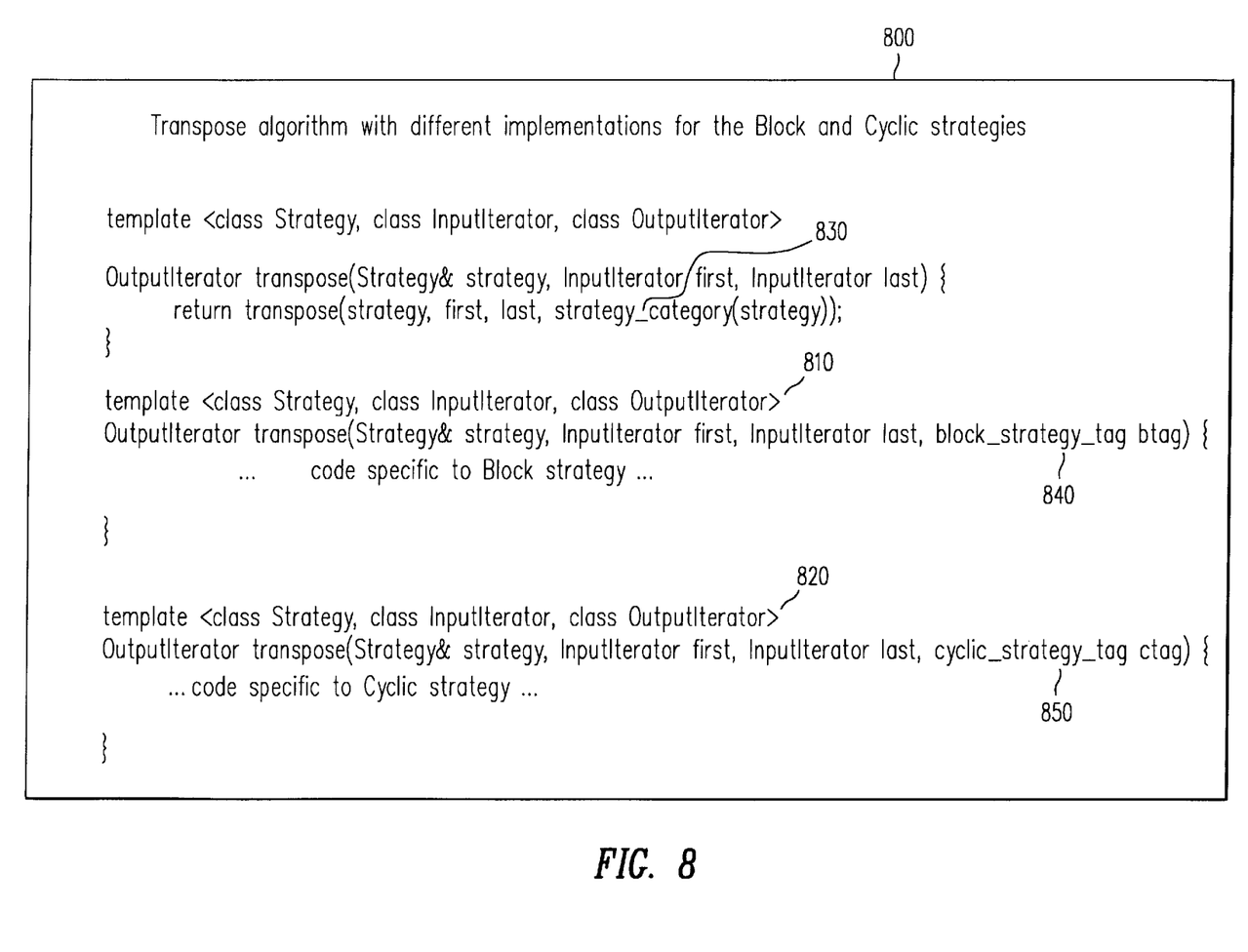
FIG. 8 illustrates a parallel algorithm implementation with multiple strategies using strategy tags and strategy categories in accordance with the present invention.

If a parallel algorithm such as transpose 800, for example, has different implementations for the block and cyclic strategies (either for reasons of efficiency or for correctness), then the parallel algorithm transpose 800 may be implemented as illustrated in FIG. 8 or as listed below:

```
template <class Strategy, class InputIterator, class OutputIterator>
OutputIterator transpose(Strategy& strategy, InputIterator first, InputIterator last) {
    return transpose(strategy, first, last, strategy_category(strategy));
}
template <class Strategy, class InputIterator, class OutputIterator>
OutputIterator transpose(Strategy& strategy, InputIterator first, InputIterator last,
block_strategy_tag btag) {
    ... code specific to Block strategy ...
}
template <class Strategy, class InputIterator, class OutputIterator>
OutputIterator transpose(Strategy& strategy, InputIterator first, InputIterator last,
cyclic_strategy_tag ctag) {
    ... code specific to Cyclic strategy ...
}
```

This parallel algorithm transpose 800 provides strategy-specific implementations, an implementation for a block strategy 810 and an implementation for a cyclic strategy 820, either of which may be selected depending upon the strategy via a strategy_category 830 and strategy tags 840 and 850.

Sample Code

Figure 9:
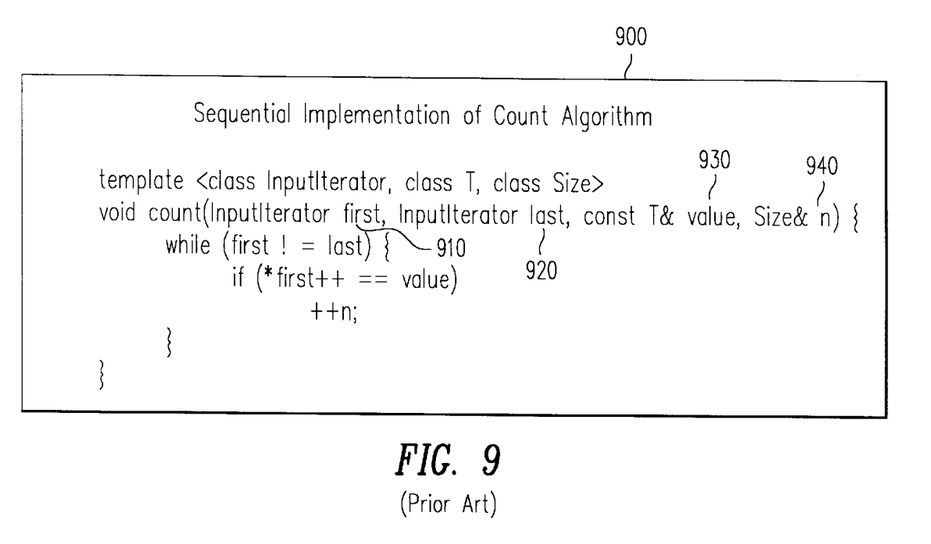
FIG. 9 illustrates a sequential implementation of an algorithm count in accordance with the prior art.

FIG. 9 illustrates a sequential iterator implementation, the STL sequential count 900 which is also listed below for convenience. The STL sequential count 900 counts a number of elements between first 910 and last 920 that have a value equal to value 930 and adds that result to n 940.

```
template <class InputIterator, class T, class Size>
void count(InputIterator first, InputIterator last, const T& value, Size& n) {
    while(first != last) {
        if(*first++ == value)
            ++n;
    }
}
```

Figure 10:
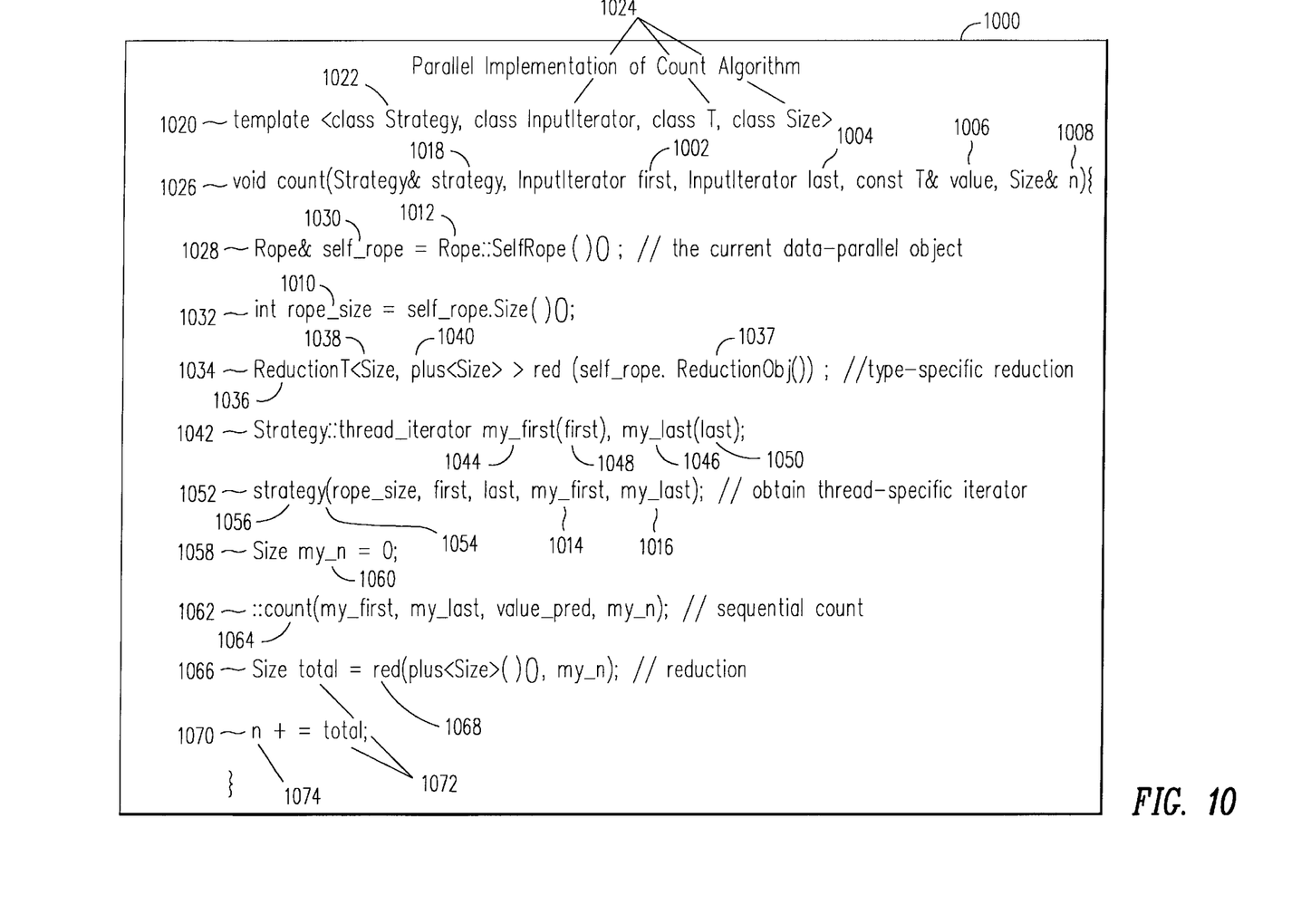
FIG. 10 illustrates a parallel implementation of an algorithm count in accordance with the present invention.

The present invention allows the sequential count 900 to be parallelized or reimplemented as a parallel algorithm count 1000 as illustrated in FIG. 10, and as listed below:

```
// Parallel implementation of count algorithm
template <class Strategy, class InputIterator, class T, class Size>
void count(Strategy& strategy, InputIterator first, InputIterator last, const T& value, Size& n){
    Rope& self_rope = Rope::SelfRope( ); // the current data-parallel object
    int rope_size = self_rope.Size( );
    ReductionT< Size, plus<Size> > red (self_rope. ReductionObj( )); //type-specific reduction
    Strategy::thread_iterator my_first(first), my_last(last);
    strategy(rope_size, first, last, my_first, my_last); // obtain thread-specific iterator
    Size my_n = 0;
    ::count(my_first, my_last, value_pred, my_n); // sequential per-thread count algorithm
    Size total = red(plus<Size>( ), my_n); // reduction
    n + = total;
}
```

The parallel count 1000 also counts a number of elements between first 1002 and last 1004 that have a value equal to value 1006 and adds that result to n 1008; however, it is performed by rope_size 1032 threads, comprising a rope 1030 or group of threads, each of these threads performing a portion of the work according to a work distribution strategy. Each of the participating threads obtains its per-thread parallel iterators 1044 and 1046 which allow the thread to traverse its portion of the iteration space according to the selected strategy 1018. The parallel count 1000 is a parallel implementation of the sequential count 900 illustrated in FIG. 9. Parallel count 1000 is a template function, statement 1020 and statement 1026, with an additional template parameter strategy 1022 for a strategy of work distribution. The remaining template parameters 1024 of the template function 1020 may be the same parameters as those of the sequential implementation of the count algorithm 900. Statement 1028 obtains the current data-parallel object (i.e., the rope or group of threads executing this data-parallel function) in "self_rope" 1030. Thereafter, statement 1032 obtains the number of threads in "rope_size" 1010. Statement 1034 then builds a type-specific reduction object 1036 from self_rope's 1030 reduction skeleton 1037 where "Size" 1038 is the type of the result of the reduction (i.e., the type of "n" 1008 in statement 1026) and "plus<Size>" 1040 specifies that the reduction is a sum reduction. Statement 1042 then creates the per-thread parallel iterators "my_first" 1044 and "my_last" 1046 based on the sequential iterators "first" 1048 and "last" 1050, and statement 1052 invokes the strategy object's "O" operators 1054 to obtain "my_first" 1014 and "my_last" 1016 per-thread parallel iterators based on the strategy 1056. Thereafter, statement 1058 initializes "my_n" 1060 to zero, and statement 1062 invokes the per-thread sequential algorithm "count" 1064 based on the per-thread parallel iterators. Statement 1066 then composes the partial results from each thread algorithm using sum reduction 1068, and statement 1070 adds this total 1072 obtained in statement 1066 to the "n" 1074 passed in statement 1026.

Figure 11:
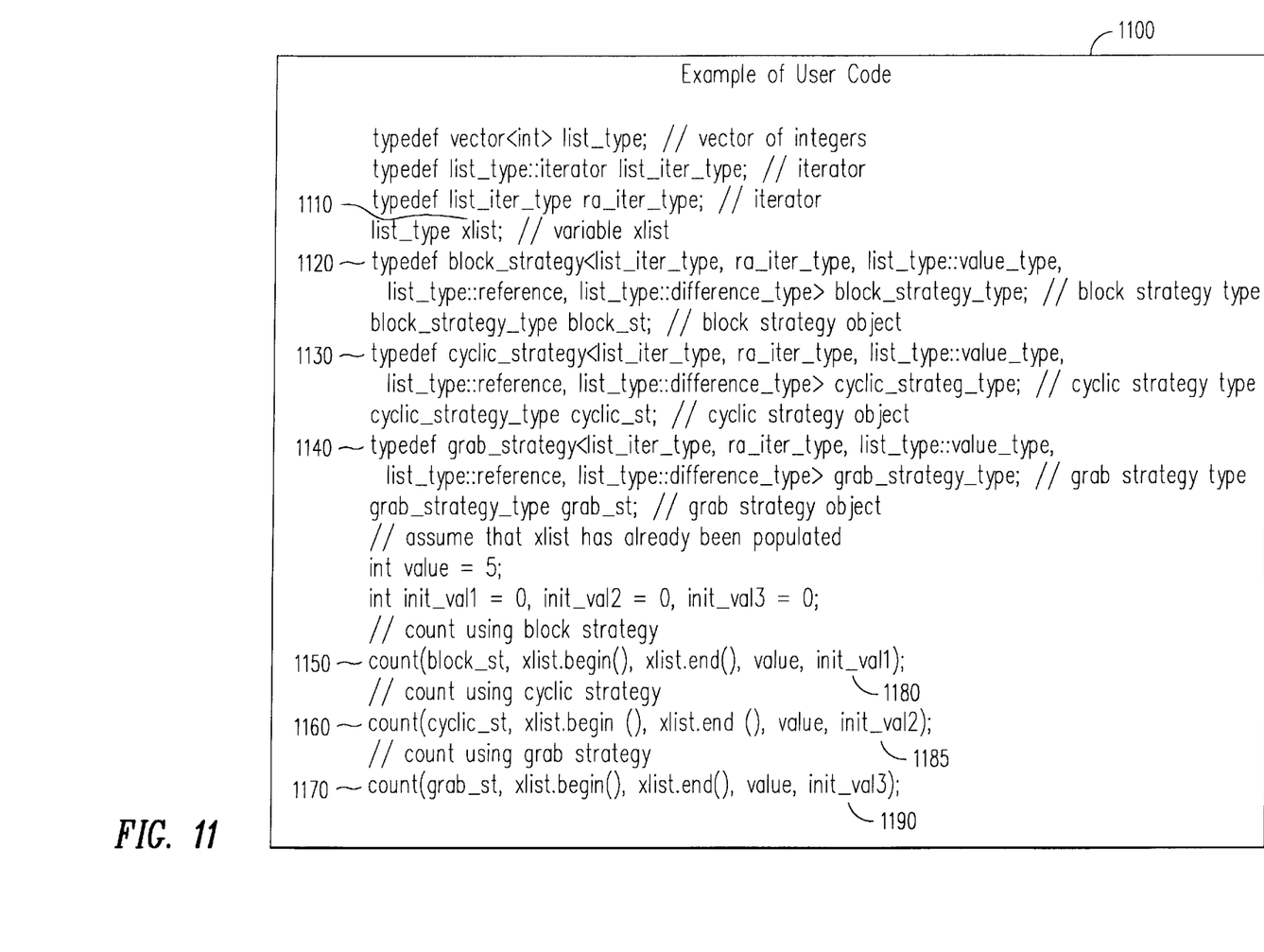
FIG. 11 shows an example of user program code which uses the parallel implementation of the algorithm count in accordance with the present invention.

The parallel implementation of count 1000 may be used by user code such as the sample user code 1100 illustrated in FIG. 11, and as listed below:

```
// Sample User Code
typedef vector<int> list_type; // vector of integers
typedef list_type::iterator list_iter_type; // iterator
typedef list_iter_type ra_iter_type; // iterator
list_type xlist; // variable xlist
typedef block_strategy<list_iter_type, ra_iter_type, list_type::value_type,
    list_type::reference, list_type::difference_type> block_strategy_type; // block strategy type
block_strategy_type block_st; // block strategy object
typedef cyclic_strategy<list_iter_type, ra_iter_type, list_type::value_type,
    list_type::reference, list_type::difference_type> cyclic_strategy_type;// cyclic strategy type
cyclic_strategy_type cyclic_st; // cyclic strategy object
typedef grab_strategy<list_iter_type, ra_iter_type, list_type::value_type,
    list_type::reference, list_type::difference_type> grab_strategy_type; // grab strategy type
grab_strategy_type grab_st; // grab strategy object
// assume that xlist has already been populated
int value = 5;
int init_val1 = 0, init_val2 = 0, init_val3 = 0;
// count using block strategy
count(block_st, xlist.begin( ), xlist.end( ), value, init_val1);
// count using cyclic strategy
count(cyclic_st, xlist.begin( ), xlist.end ( ), value, init_val2);
// count using grab strategy
count(grab_st, xlist.begin( ), xlist.end( ), value, init_val3);
```

The sample user code 1100 searches for a value 5 in a vector of integers 1110. Sample user code 1100 uses three different strategies (block strategy 1120, cyclic strategy 1130, and grab strategy 1140) to search for the value 5. Although the parallel implementation of count 1000 is independent of the strategy used for searching, the performance of the different strategy searches (1150, 1160, 1170) may be different, though the results from the three searches (1180, 1185, 1190) will be the same.

Figure 12:
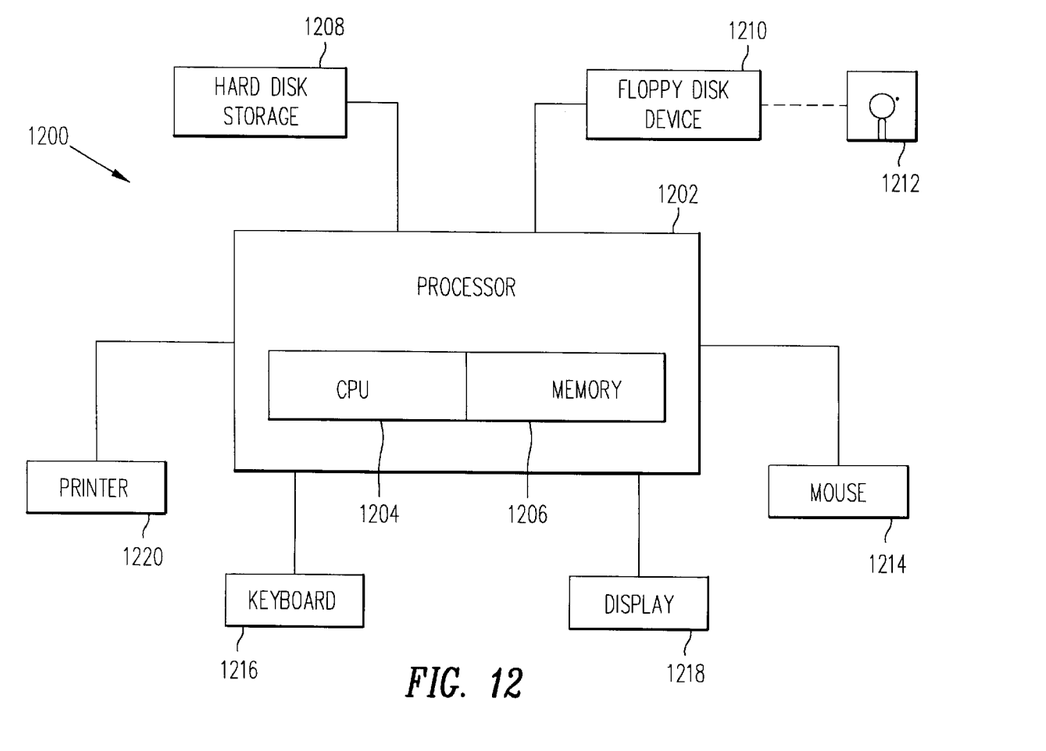
FIG. 12 is a block diagram of a computer system used in performing the method of the present invention, forming part of the apparatus of the present invention, and which may use the article of manufacture comprising a computer-readable storage medium having a computer program embodied in said medium which may cause the computer system to practice the present invention.

Referring now to FIG. 12, a block diagram illustrates a computer system 1200 used in performing the method of the present invention, forming part of the apparatus of the present invention, and which may use the article of manufacture comprising a computer-readable storage medium having a computer program embodied in said medium which may cause the computer system to practice the present invention. The computer system 1200 includes a processor 1202, which includes a central processing unit (CPU) 1204, and a memory 1206. Additional memory, in the form of a hard disk file storage 1208 and a computer-readable storage device 1210, is connected to the processor 1202. Computer-readable storage device 1210 receives a computer-readable storage medium 1212 having a computer program embodied in said medium which may cause the computer system to implement the present invention in the computer system 1200. The computer system 1200 includes user interface hardware, including a mouse 1214 and a keyboard 1216 for allowing user input to the processor 1202 and a display 1218 for presenting visual data to the user. The computer system may also include a printer 1220.

Although the present invention has been particularly shown and described with reference to a preferred embodiment, it will be understood by those skilled in the art that various changes in form and detail may be made without departing from the spirit and the scope of the invention.

I claim:

1. A method of providing a plurality of parallel iterators for execution by a processor, said method comprising the steps of:

passing a sequential iterator to an adaptor;
converting from the sequential iterator to the plurality of parallel iterators by use of the adaptor, wherein the adaptor performs the conversion based on a parallel work distribution strategy and the adaptor is a template function having a template parameter representing the strategy, and wherein the template function has an operator that, given the sequential iterator, returns the plurality of parallel iterators and has a strategy tag parameter indicating strategy specific implementations; and returning the plurality of parallel iterators.

2. The method of claim 1 wherein the strategy is a member of the set comprising a block strategy, a cyclic strategy, a grab strategy, and a user-defined strategy.

3. A computer system for providing a plurality of parallel iterators for execution by a processor, said computer system comprising:

a sequential iterator; and
an adaptor for converting from the sequential iterator to the plurality of parallel iterators, wherein the adaptor performs the conversion based on a parallel work distribution strategy and the adaptor is a template function having a template parameter representing the strategy, and wherein the template function has an operator that, given the sequential iterator, returns the plurality of parallel iterators and has a strategy tag parameter indicating strategy specific implementations.

4. The computer system of claim 3 wherein the strategy is a member of the set comprising a block strategy, a cyclic strategy, a grab strategy, and a user-defined strategy.

5. An article of manufacture for use in a computer system for providing a plurality of parallel iterators for execution by a processor, said article of manufacture comprising a computer-readable storage medium having a computer program embodied in said medium which may cause the computer system to:

pass a sequential iterator to an adaptor;
convert from the sequential iterator to the plurality of parallel iterators by use of the adaptor, wherein the adaptor performs the conversion based on a parallel work distribution strategy and the adaptor is a template function having a template parameter representing the strategy, and wherein the template function has an operator that, given the sequential iterator, returns the plurality of parallel iterators and has a strategy tag parameter indicating strategy specific implementations; and return the plurality of parallel iterators.

6. The article of manufacture of claim 5 wherein the strategy is a member of the set comprising a block strategy, a cyclic strategy, a grab strategy, and a user-defined strategy.

* * * * *